United States Patent
Okuyama et al.

(10) Patent No.: US 6,762,142 B2
(45) Date of Patent: Jul. 13, 2004

(54) DIELECTRIC CERAMIC AND DIELECTRIC DEVICE

(75) Inventors: Kojiro Okuyama, Ikoma (JP); Junichi Kato, Osaka (JP); Hiroshi Kagata, Hirakata (JP); Kenji Iijima, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 27 days.

(21) Appl. No.: 10/251,585

(22) Filed: Sep. 19, 2002

(65) Prior Publication Data

US 2003/0116891 A1 Jun. 26, 2003

(30) Foreign Application Priority Data

Sep. 26, 2001 (JP) ........................................ 2001-294623

(51) Int. Cl.[7] ........................ C04B 35/465; C04B 35/49
(52) U.S. Cl. .................... 501/134; 501/136; 331/219.1
(58) Field of Search ................................ 501/134, 136; 331/219.1

(56) References Cited

U.S. PATENT DOCUMENTS

| 5,356,843 A | 10/1994 | Okuyama et al. | ........... 501/134 |
| 5,470,808 A | * 11/1995 | Okuyama et al. | ........... 501/134 |
| 5,700,745 A | * 12/1997 | Okuyama et al. | ........... 501/134 |

FOREIGN PATENT DOCUMENTS

| JP | 62-132769 | | 6/1987 |
| JP | 2-192460 | | 7/1990 |
| JP | 409071457 | * | 3/1997 |
| JP | 2768455 | | 4/1998 |

* cited by examiner

*Primary Examiner*—Karl Group
(74) *Attorney, Agent, or Firm*—Merchant & Gould P.C.

(57) ABSTRACT

A dielectric ceramic is made of a sintered body of a complex oxide including at least one element selected from the group consisting of Zr, Ti and Mn, at least one element selected from the group consisting of Mg, Zn and Co, and at least one element selected from the group consisting of Nb and Ta, wherein, the complex oxide is represented by a formula $xZrO_2\text{-}yTiO_2\text{-}zA_{(1+w)/3}B_{(2-w)/3}O_2$ where 'A' in the formula denotes at least one element selected from the group (A) consisting of Mg, Zn and Co, 'B' denotes at one element selected from the group (B) consisting of Nb and Ta; x, y, z and w denote values in the respective ranges of $0.20 \leq x \leq 0.55$, $0.40 \leq y \leq 0.55$, $0.05 \leq z \leq 0.25$, and $0 \leq w \leq 0.30$, and x, y and z have a relationship represented as $x+y+z=1$; MnO is present in a range of 0.1 mol % to 1.0 mol % to the complex oxide; and an average grain size of the dielectric ceramic is from 10 $\mu$m to 70 $\mu$m, thereby providing a dielectric ceramic that has a high dielectric constant ($\epsilon r$) and an unloaded (Qu) value even in a comparatively low frequency region as a microwave region i.e., in a range of 0.4 GHz to 2.4 GHz and that realizes a desired temperature coefficient ($\tau f$) of a resonant frequency with a high mechanical strength, and thus a dielectric device using the dielectric ceramic is provided.

14 Claims, 2 Drawing Sheets

DIELECTRIC CERAMIC AND DIELECTRIC DEVICE

FIELD OF THE INVENTION

The present invention relates to a dielectric ceramic and a dielectric device for use in high-frequency regions such as microwave regions and millimeter-wave regions.

BACKGROUND OF THE INVENTION

Recently, dielectric ceramics for microwave regions and millimeter-wave regions have been used widely in dielectric resonators and filters. It is required that a dielectric material used for such purposes has a high unloaded Q (Qu) value and a high dielectric constant ($\epsilon r$), and that the temperature coefficient ($\tau f$) of a resonant frequency is small and variable as desired.

Various materials appropriate for use in such applications have been reported. The examples include a $ZrO_2$—$SnO_2$—$TiO_2$—MgO ceramic disclosed in JP-62(1987)-132769 A and a $ZrO_2$—$SnO_2$—$TiO_2$—CoO—$Nb_2O_5$ ceramic disclosed in JP-02(1990)-192460 A.

However, the conventional materials suffer from problems, for example, the unloaded Q value and/or the dielectric constant is low, or a desired temperature coefficient of a resonant frequency cannot be realized.

Though the applicant suggests a Zr—Ti—Mn-based dielectric ceramic in JP 2768455 (U.S. Pat. No. 5,356,843), the average grain size in this method exceeds 100 µm and the mechanical strength is not sufficient.

Although the product of a resonant frequency (f) and a Qu value is generally regarded as being constant in a given material, actually, the product fQu is reduced considerably when a bigger device is produced and the resonant frequency is lowered. Therefore, there is a strong demand for, e.g., a dielectric resonator for a base station of a mobile radio communication system to have a high Qu value.

Moreover, since defects such as chips and fractures will occur often when the mechanical strength of a dielectric ceramic is low, the mechanical strength of the dielectric ceramic should be increased in production of such devices.

The cost for polishing is increased among the whole cost of producing the dielectric device, and precision in adjusting the frequency cannot be satisfactory.

Since dielectric resonators used in the relatively-low frequency regions of 0.4 GHz to 2.4 GHz tend to be very bulky, reduction in size is highly demanded.

SUMMARY OF THE INVENTION

A first object of the present invention is to provide a dielectric ceramic having a high Qu value and $\epsilon r$ even in a relatively-low frequency region so as to realize a desired $\tau f$, and the dielectric ceramic has an improved mechanical strength as a result of optimizing the average grain size. A second object of the present invention is to provide a cost-effective and highly precise method for adjusting the frequency. Furthermore, a third object of the present invention is to provide a small dielectric device having a high Qu value in a frequency region of 0.4 GHz to 2.4 GHz.

For achieving the above-described objects, a dielectric ceramic according to the present invention includes a sintered body of a complex oxide comprising at least one element selected from the group consisting of Zr, Ti and Mn, at least one element selected from the group consisting of Mg, Zn and Co, and at least one element selected from the group consisting of Nb and Ta, wherein the complex oxide is represented by a formula of $xZrO_2\text{-}yTiO_2\text{-}zA_{(1+w)/3}B_{(2-w)/3}O_2$ where 'A' in the formula denotes at least one element selected from the group (A) consisting of Mg, Zn and Co, 'B' denotes at least one element selected from the group (B) consisting of Nb and Ta; x, y, z and w denote values respectively in the ranges of $0.20 \leq x \leq 0.55$, $0.40 \leq y \leq 0.55$, $0.05 \leq z \leq 0.25$, $0 \leq w \leq 0.30$, and x, y and z have a relationship represented by $x+y+z=1$; MnO is present in a range of 0.1 mol % to 1.0 mol % to the complex oxide; and an average grain size of the dielectric ceramic is from 10 µm to 70 µm.

A method for producing a dielectric ceramic according to the present invention includes calcining a material containing at least one element selected from the group (A) consisting of Zr, Ti, Mn, Mg, Zn, and Co, and at least one element selected from the group (B) consisting of Nb and Ta; pulverizing, adding a binder and press-molding the material to form a molded product, heating the product to remove the binder, and firing the product at a temperature of 1200° C. to 1400° C., subsequently annealing the product at a temperature lower than the firing temperature by a range of 50° C. to 100° C.

Next, a dielectric device according to the present invention includes a metal housing and a dielectric ceramic placed in a cavity of the metal housing, wherein the dielectric ceramic is made of a sintered body of a complex oxide containing at least one element selected from the group consisting of Zr, Ti and Mn, at least one element selected from the group consisting of Mg, Zn and Co, and at least one element selected from the group consisting of Nb and Ta, in which the complex oxide is at least one element represented by a formula $xZrO_2\text{-}yTiO_2\text{-}zA_{(1+w)/3}B_{(2-w)/3}O_2$ where 'A' in the formula denotes at least one element selected from the group (A) consisting of Mg, Zn and Co, 'B' denotes at least one element selected from the group (B) consisting of Nb and Ta; x, y, z and w denote values in the respective ranges of $0.20 \leq x \leq 0.55$, $0.40 \leq y \leq 0.55$, $0.05 \leq z \leq 0.25$, and $0 \leq w \leq 0.30$, and x, y and z have a relationship represented by $x+y+z=1$; MnO is present in a range of 0.1 mol % to 1.0 mol % to the complex oxide, and an average grain size of the dielectric ceramic is from 10 µm to 70 µm.

DETAILED DESCRIPTION OF THE INVENTION

Figure 1A:
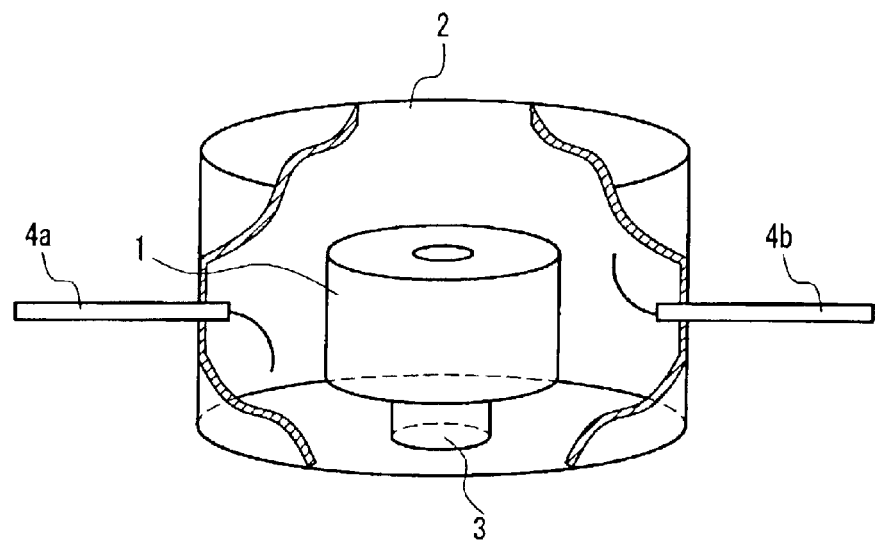
FIG. 1A is a partially-sectional perspective view of a $TE_{01\delta}$ mode dielectric resonator for 2.4 GHz in an embodiment of the present invention.

Preferable embodiments in the present invention will be described in detail below.

A dielectric ceramic as one example in the present invention contains MnO in a range of 0.1 mol % to 1.0 mol % with respect to a complex oxide represented by a formula of $xZrO_2\text{-}yTiO_2\text{-}zA_{(1+w)/3}B_{(2-w)/3}O_2$, and the average grain size is from 10 µm to 70 µm. Here, 'A' in the formula denotes at least one element selected from the group consisting of Mg, Zn, and Co, 'B' denotes at least one element selected from the group consisting of Nb and Ta; x, y, z and w denote values in the respective ranges of $0.20 \leq x \leq 0.55$, $0.40 \leq y \leq 0.55$, $0.05 \leq z \leq 0.25$, and $0 \leq w \leq 0.30$, and x, y and z have a relationship represented by x+y+z=1. When the contents of x, y, z, w and MnO are out of the above-described ranges, it may not be possible to obtain sufficiently high Qu values. Moreover, the absolute value of τf may be increased excessively. In case the average grain size is out of the range of 10 μm to 70 μm, the mechanical strength would deteriorate. It is more preferable that the average grain size is in a range of 10 μm to 50 μm.

Another preferred dielectric ceramic according to the present invention contains MnO in a range of 0.1 mol % to 1.0 mol % with respect to a complex oxide represented by a formula of $xZrO_2\text{-}yTiO_2\text{-}zA_{(1+w)/3}Nb_{(2-w)/3}O_2$ where 'A' in the formula denotes at least one element selected from the group (A) consisting of Mg and Zn; x, y, z and w denote values in the respective ranges of $0.32 \leq x \leq 0.43$, $0.50 \leq y \leq 0.54$, $0.07 \leq z \leq 0.14$, and $0 \leq w \leq 0.15$, and x, y and z have a relationship represented as x+y+z=1, and the average grain size is in a range of 10 μm to 70 μm. When the contents of x, y, z, w and MnO are out of the above-described ranges, it may not be possible to obtain sufficiently high Qu values. Moreover, the absolute value of τf may be increased excessively. In case the average grain size is out of the range of 10 μm to 70 μm, the mechanical strength would deteriorate. It is more preferable that the average grain size is in a range of 10 μm to 50 μm.

The dielectric ceramic according to the present invention is obtained by mixing starting materials at a predetermined ratio, calcining and molding the mixture, and further firing the molded product.

Any compound such as the oxide, carbonate, hydroxide, chloride or alkoxide of the component element described above may be used as a starting material of the dielectric ceramic according to the present invention without any specific limitations. Methods that can be employed for blending powdery raw materials include wet-blending for mixing the materials with water or an organic solvent in a ball mill and dry-blending for mixing them by a mixer, a ball mill or the like without using any solvent. Alternatively, an alkoxide method or a co-precipitation method may be used depending on the starting materials. Among these methods, it is desirable to employ the wet-blending method for mixing in a ball mill by using a solvent, since the process is comparatively uncomplicated and a homogeneous mixture can be obtained easily. In this method, a dispersant additionally may be used for increasing the dispersing property of the powders, or pH adjustment may be performed.

Although the calcination condition varies depending on the particular compositions, the time for the calcination is generally about 1–8 hours at a temperature of about 900° C. to 1200° C. As a method of pulverizing the calcined material or mixture, any methods such as use of a ball mill, a high-speed rotor mill, a media agitating mill and a jet mill, may be employed.

For molding, press-molding generally is carried out. Although not specifically limited, the pressure used in the press-molding is generally in a range of about 50 MPa to 200 MPa. A binder can be used for the molding. Though the binder will not be limited specifically as long as it can be used for ceramic molding, the examples include a polyvinyl alcohol-based binder, a polyvinyl butyral-based binder, an acrylic resin-based binder, and wax-based binder. Though there is no specific limitation about the amount of the binder used, in general, it is preferred to be in a range of about 0.05 wt % to 1 wt % in terms of the solid to the whole amount.

Though there is no specific limitation about the firing condition, it is preferable that the material is heated for about 4–100 hours at a temperature of about 400° C. to 700° C. to remove the binder, and then fired for about 2–50 hours at a temperature of 1200° C. to 1400° C. The average grain size can be optimized within a range of 10 μm to 70 μm by firing the product at a temperature of 1200° C. to 1400° C. The firing can be carried out in the air, and there is no specific limitation about the atmosphere.

For realizing a still higher Qu value, it is preferable that the material is annealed after the firing, and the annealing temperature is lower by a range of 50° C. to 100° C. than the firing temperature. The Qu value would not be improved in case the difference between the annealing temperature and the firing temperature is less than 50° C. or more than 100° C. Though the annealing condition varies depending on the firing condition, it is preferable in general that the annealing is carried out at a temperature of 1100° C. to 1350° C. for about 2–20 hours. After the annealing, the dielectric ceramic is cooled to room temperature. The annealing can be carried out in the air, and there is no specific limitation about the atmosphere.

For adjusting the resonant frequency of the obtained dielectric ceramic, the dielectric ceramic further is treated with heat for 2–20 hours at a temperature of 800° C. to 1200° C. The resonant frequency would not change in case the heating temperature is lower than 800° C. or higher than 1200° C. The heat treatment can be carried out in the air, and there is no specific limitation about the atmosphere.

An explanation about a dielectric device in the present invention follows.

Figure 1B:
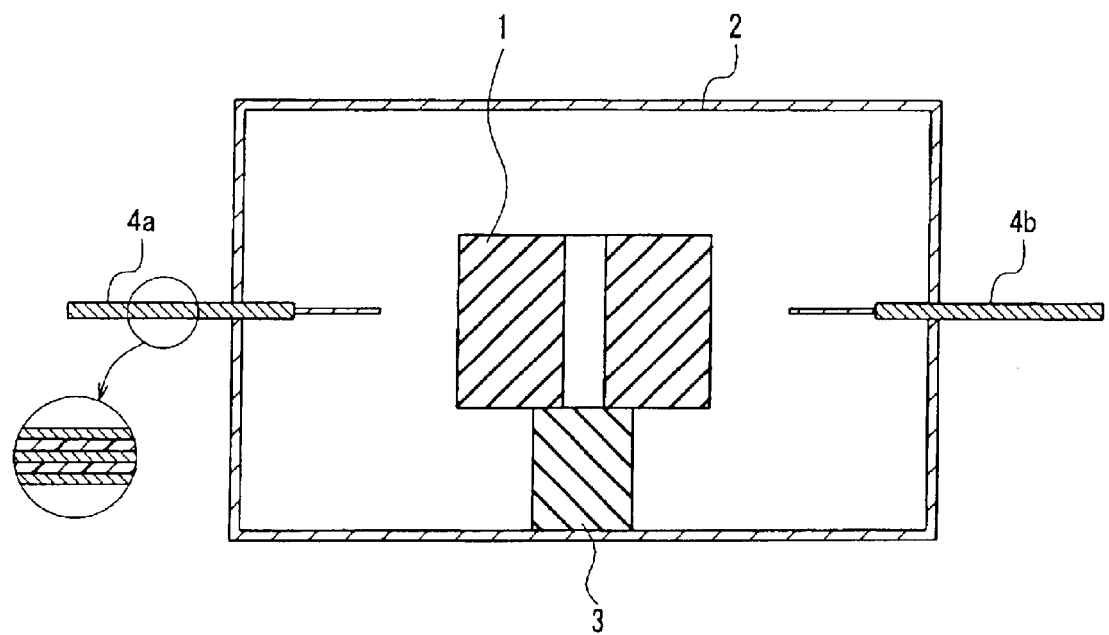
FIG. 1B is a cross-sectional view of the dielectric resonator.

FIG. 1A is a partially-sectional perspective view of a $TE_{01\delta}$ mode dielectric resonator for 2.4 GHz in an embodiment of the present invention, and FIG. 1B is a cross-sectional view of the dielectric resonator. This dielectric resonator has a dielectric ceramic 1, a supporting base 3 for supporting the dielectric ceramic 1, a metal housing 2, and coaxial cables 4a and 4b with protruded central conductors. For facilitating the explanation, the metal housing 2 is partially sectioned in FIG. 1A.

The dielectric ceramic 1 is composed of a dielectric ceramic according to the present invention. The dielectric ceramic 1 is shaped as a column in general, though there is no specific limitation. The metal housing 2 is shaped in general as a closed-type cylinder, though there is no specific limitation. It is preferable that the metal housing is made of a highly conductive metal, such as copper, copper-plated steel, silver-plated copper, or silver-plated brass.

The resonant frequency of $TE_{01\delta}$ mode is excited by an electromagnetic wave transmitted through the coaxial cable 4a or 4b and outputted through the coaxial cable 4b or 4a, and thus a $TE_{01\delta}$ mode dielectric resonator is formed.

Figure 2A:
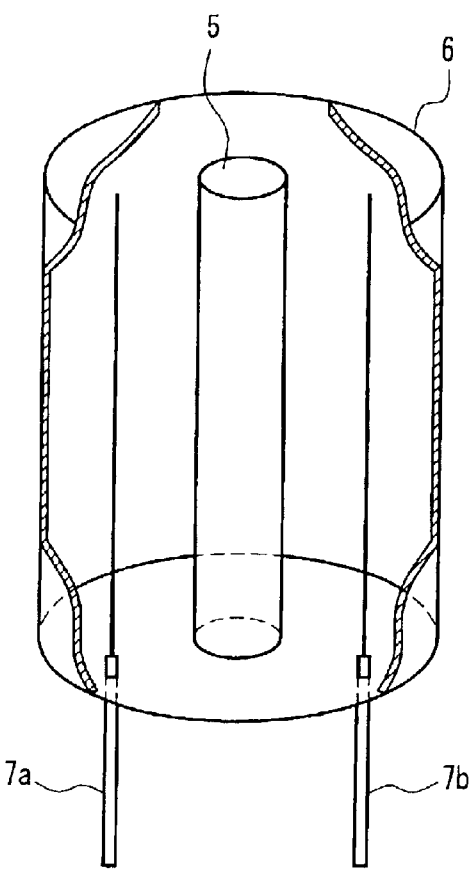
FIG. 2A is partially-sectional perspective view of a TM mode dielectric resonator for 2 GHz in another embodiment of the present invention.
Figure 2B:
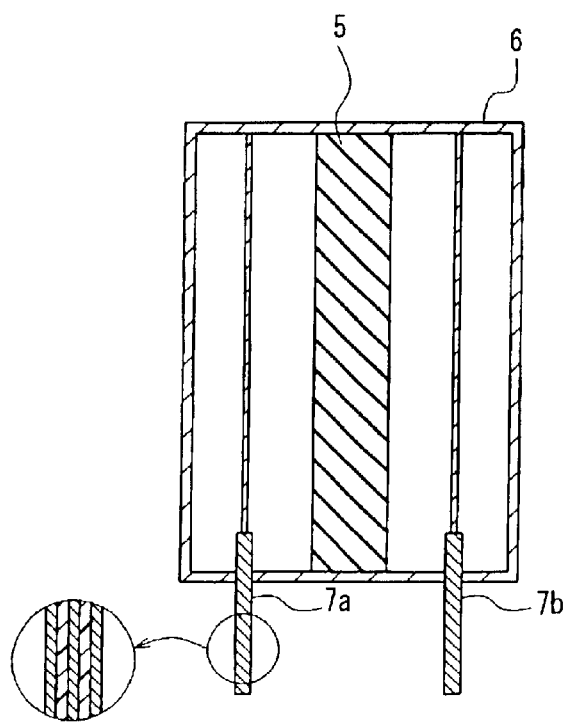
FIG. 2B is a cross-sectional view of the dielectric resonator.

FIG. 2A is partially-sectional perspective view of a TM mode dielectric resonator for 2 GHz in another embodiment of the present invention, and FIG. 2B is a cross-sectional view of the dielectric resonator. This dielectric resonator has a dielectric ceramic 5, a metal housing 6 circumscribing the upper and lower end faces of the dielectric ceramic 5, and coaxial cables 7a and 7b with protruded central conductors. For facilitating the explanation, the metal housing 6 is partially sectioned in FIG. 2A.

The dielectric ceramic 5 is composed of a dielectric ceramic according to the present invention. The dielectric ceramic 5 is shaped as a column in general, though there is no specific limitation. The metal housing is shaped in general as a closed-type cylinder, though there is no specific limitation. It is preferable that the metal housing is made of a highly conductive metal, such as copper, copper-plated steel, silver-plated copper, or silver-plated brass.

The resonant frequency of TM mode is excited by an electromagnetic wave transmitted through the coaxial cable 7a or 7b and outputted through the coaxial cable 7b or 7a, and thus a TM mode dielectric resonator is formed.

A dielectric ceramic according to the present invention has a high Qu value and εr even in a relatively low frequency region so as to realize a desired τf with an improved mechanical strength. The present invention can provide a low-loss, small, and cost-effective dielectric device that is suitable for use in a region having a frequency region of 0.4 GHz to 2.4 GHz.

Since the producing method according to the present invention can provide a dielectric ceramic having a high Qu value and can vary the resonant frequency within a wide range, frequencies can be adjusted with a high precision at a low cost in comparison with conventional methods.

EXAMPLES

The present invention will be described below more specifically by referring to Examples, though the present invention is not limited to the Examples. (Example 1)

As starting materials, powders of $ZrO_2$, $TiO_2$, MgO, ZnO, CoO, $Nb_2O_5$, $Ta_2O_5$, and $MnCO_3$ were prepared. These materials are weighed to make predetermined compositions, and wet-blended with ethanol by using a ball mill. The volume ratio between the powders and the ethanol was about 2:3. The thus obtained mixture was taken out from the ball mill, dried at 110° C., and calcined for 2 hours at 1000° C. in the air. The calcination product was wet-pulverized in the ball mill with ethanol. After the pulverized slurry was taken out from the ball mill and dried, the thus obtained powders were mixed with 8% by weight of polyvinyl alcohol solution of 6% in concentration added thereto as a binder, homogenized, and granulated by sieving through a 32-mesh screen. The granulated powders were molded by using a mold and an oil hydraulic press at a molding pressure of 100 MPa. A sample for evaluation of the electric characteristics was molded into a column 35 mm in diameter and about 15 mm in thickness, and a sample for evaluation of the mechanical strength was molded into a plate 40 mm in length, 5 mm in width and about 1.5 mm in thickness. The molded product was placed in a magnesia vessel of high purity, retained in the air at a temperature of 600° C. for 12 hours to remove the binders, then retained in the air at a temperature of 1200° C. to 1400° C. for 4 hours for firing, thereby obtaining a dielectric ceramic. The rates of temperature rise and fall during the firing are 200° C./h.

In the evaluation of the electric characteristics of the dielectric ceramic, a network analyzer was used for obtaining the unloaded (Qu) value, resonant frequency, and dielectric constant (εr) based on a measurement using a dielectric rod resonator method. In this method, a dielectric loss (1/Q) is measured on the basis of (resonant frequency of $TE_{01\delta}$ mode)/(half-power width) by using the structure shown in FIG. 1. The temperature coefficient (τf) of the resonant frequency was obtained in a temperature range of −25° C. to 85° C. The resonant frequency was about 2 GHz.

In the evaluation of the mechanical strength of the dielectric ceramic, a dielectric ceramic plate was polished to be 1 mm in thickness in order to obtain the transverse rupture strength by a four-point bend test method.

The average grain size was calculated by evaluating an electron micrograph of a free surface of the fired body of the dielectric ceramic by an intercept method. The average grain size of the free surface of the fired body was substantially same as that of the interior of the same product.

The following Table 1 indicates compositions of the produced dielectric ceramics. The electric characteristics, the transverse rupture strengths, and the average grain sizes are indicated in Table 2. In Tables 1 and 2, each number with an asterisk denotes a comparative example.

TABLE 1

| Sample No. | Elements | | Compositions | | | | |
|---|---|---|---|---|---|---|---|
| | | | (Molar fraction) | | | (Value) | (mol %) |
| | A | B | x | y | z | w | MnO |
| *1 | Zn | Nb | 0.40 | 0.15 | 0.45 | 0 | 0 |
| *2 | Mg | Nb | 0.15 | 0.12 | 0.73 | 0 | 0.1 |
| 3 | Mg | Nb | 0.20 | 0.55 | 0.25 | 0 | 0.2 |
| 4 | Zn | Nb | 0.55 | 0.40 | 0.05 | 0 | 0.2 |
| 5 | Co | Ta | 0.55 | 0.40 | 0.05 | 0 | 0.2 |
| 6 | $Mg_{1/2}Co_{1/2}$ | Nb | 0.45 | 0.50 | 0.05 | 0.10 | 0.2 |
| 7 | $Mg_{1/2}Co_{1/2}$ | Nb | 0.45 | 0.50 | 0.05 | 0.30 | 0.2 |
| *8 | $Mg_{1/2}Co_{1/2}$ | Nb | 0.45 | 0.50 | 0.05 | 1.00 | 0.2 |
| 9 | Mg | $Nb_{1/2}Ta_{1/2}$ | 0.45 | 0.50 | 0.05 | 0.10 | 1.0 |
| *10 | Mg | $Nb_{1/2}Ta_{1/2}$ | 0.45 | 0.50 | 0.05 | 0.10 | 3.0 |
| 11 | Mg | Nb | 0.32 | 0.54 | 0.14 | 0.10 | 0.2 |
| 12 | Zn | Nb | 0.43 | 0.50 | 0.07 | 0.10 | 0.2 |
| 13 | $Mg_{54/100}Zn_{46/100}$ | Nb | 0.37 | 0.51 | 0.12 | 0.10 | 0.1 |
| 14 | $Mg_{54/100}Zn_{46/100}$ | Ta | 0.37 | 0.51 | 0.12 | 0.10 | 0.1 |
| 15 | $Mg_{54/100}Zn_{46/100}$ | Nb | 0.37 | 0.51 | 0.12 | 0.15 | 0.1 |
| 16 | $Mg_{54/100}Zn_{46/100}$ | Nb | 0.37 | 0.51 | 0.12 | 0.15 | 1.0 |
| 17 | Zn | Nb | 0.32 | 0.54 | 0.14 | 0.10 | 0.5 |

*For a sample where A or B is composed of plural elements, the ratio of the elements is indicated on the basis of the molar fraction.

TABLE 2

| Sample No. | Dielectric constant $\epsilon r$ | Temperature coefficient $\tau f$ (ppm/° C.) | Unloaded Qu | Transverse rupture strength (MPa) | Average grain size ($\mu$m) |
|---|---|---|---|---|---|
| *1 | 30.0 | −89 | 4000 | 110 | 5 |
| *2 | 28.0 | −85 | 3500 | 100 | 8 |
| 3 | 49.2 | 31 | 18000 | 150 | 10 |
| 4 | 37.3 | 18 | 21000 | 180 | 25 |
| 5 | 36.4 | 14 | 23200 | 175 | 20 |
| 6 | 42.0 | 10 | 22400 | 180 | 32 |
| 7 | 40.8 | 9 | 23800 | 155 | 15 |
| *8 | 36.2 | 3 | 16300 | 85 | 7 |
| 9 | 42.5 | 12 | 24100 | 165 | 24 |
| *10 | 40.7 | 13 | 15400 | 110 | 75 |
| 11 | 44.5 | 10 | 27000 | 165 | 50 |
| 12 | 42.1 | 8 | 26700 | 175 | 20 |
| 13 | 42.8 | −1 | 28100 | 195 | 35 |
| 14 | 42.6 | −5 | 31000 | 180 | 30 |
| 15 | 42.2 | −2 | 29500 | 175 | 20 |
| 16 | 42.1 | −4 | 30500 | 160 | 28 |
| 17 | 44.2 | 5 | 25500 | 155 | 70 |

As shown in Table 2, the samples of the present invention provided high Qu values of at least 18000, high $\epsilon r$ of about 36–49, small $\tau f$ of at most 40 ppm/° C. in terms of absolute values, and high transverse rupture strengths of at least 150 MPa.

Furthermore, the Qu value was still higher when the sample is a third dielectric ceramic of the present invention, where 'A' is at least one element selected from the group consisting of Mg and Zn, and x, y, z, and w denote values in the respective ranges of $0.32 \leq x \leq 0.43$, $0.50 \leq y \leq 0.54$, $0.07 \leq z \leq 0.14$, and $0 \leq w \leq 0.15$, and x, y and z have a relationship represented as $x+y+z=1$. When the element 'A' is either Zn or a mixture of Mg and Zn, the firing temperature can be lowered by a range of 50° C. to 100° C. in comparison with a case using any other elements, thereby reducing the production cost.

For the samples of numbers with asterisks, at least one of the above-identified characteristics (Qu value, $\epsilon r$, $\tau f$, and transverse rupture strength) went out of the range when the average grain size was out of the range of the present invention. The transverse rupture strength was lowered remarkably. None of samples Nos. *1, *2, *8, and *10 provided preferable results, since, for the sample No. *1, MnO was 0 mol %. For the sample No. *2, the values of x, y, z were out of the range of the present invention. For the sample No. *8, w was 1.00, and for the sample No. *10, MnO was 3.0 mol %.

Samples Nos. 1 and 13 were used for producing $TE_{01\delta}$ mode dielectric resonators as shown in FIGS. 1A and 1B. A metal housing of the resonator had inside dimensions (height and diameter) twice as much as those of the dielectric ceramic (i.e., the dielectric ceramic was about 25 mm in diameter and about 12.5 mm in height; the metal housing was about 50 mm in diameter and about 25 mm in height), and made of copper plated with silver (10 $\mu$m in thickness). The resonant frequency was about 2.4 GHz. In an evaluation of Qu values of the respective $TE_{01\delta}$ mode dielectric resonators, a Qu value of the sample No. 13 was 8 times that of the sample No. 1.

Furthermore, dielectric ceramics similar to the samples Nos. 1 and 13 were used for producing $TE_{01\delta}$ mode dielectric resonators having a resonant frequency of 400 MHz. The dielectric ceramics were about 220 mm in diameter and about 100 mm in height. The metal housings had substantially the same inside dimensions and materials as in the case of 2.4 GHz. In an evaluation of the Qu values of the respective $TE_{01\delta}$ mode dielectric resonators, a Qu value of the dielectric ceramic similar to sample No. 13 was 15 times that of the dielectric ceramic similar to sample No. 1.

Other dielectric ceramics similar to samples Nos. 1 and 13 were used for producing TM mode dielectric resonators as shown in FIGS. 2A and 2B. The dielectric ceramics were about 9 mm in diameter, and about 30 mm in height. The metal housings had inside dimensions of 22 mm in diameter and 30 mm in height. The metal housings were made of the substantially the same materials as those of the $TE_{01\delta}$ mode dielectric resonators. The resonant frequency was about 2 GHz. In an evaluation of the Qu values of the respective TM mode dielectric resonators, a Qu value of the dielectric ceramic similar to sample No. 13 was 5 times that of the dielectric ceramic similar to sample No. 1.

It was confirmed that a dielectric device of the present invention has a high Qu value in a frequency region of 0.4 GHz to 2.4 GHz. Furthermore, the dielectric device using a dielectric ceramic having a high dielectric constant and a high Qu value according to the present invention can be miniaturized considerably while maintaining capabilities that are equal to or higher than those of a conventional dielectric device. (Example 2)

A disc-shape molded product obtained in the method as in the Example 1 was placed in a magnesia vessel of high purity, retained in the air at a temperature of 600° C. for 12 hours to remove the binders. The product was retained in the air at 1300° C. for 4 hours to fire, and further retained for 4 hours at a temperature of 1280° C. or lower to anneal, thereby obtaining the dielectric ceramic. During the firing, the rate of temperature rise is 200° C./h, the rate that the temperature falls from the firing temperature to the annealing temperature is 20° C./h, and the rate that the temperature falls from the annealing temperature to room temperature is 200° C./h.

The produced dielectric ceramic had compositions similar to those of the sample No. 13 in Example 1. Table 3 indicates the annealing temperatures and Qu values obtained as in Example 1. In Table 3, each number with an asterisk denotes a comparative example.

TABLE 3

| Sample No. | Annealing temp.(° C.) | Unloaded Qu |
|---|---|---|
| *18 | 1100 | 27900 |
| 19 | 1200 | 29500 |
| 20 | 1225 | 30000 |
| 21 | 1250 | 31500 |
| *22 | 1280 | 28100 |

As shown in Table 3, the Qu values of the samples according to the present invention were raised further due to the annealing. Qu values of the samples having asterisks did not change substantially. (Example 3)

A disc-shape molded product obtained in the method as in the Example 1 was placed in a magnesia vessel of high purity, retained in the air at a temperature of 600° C. for 12 hours to remove the binders. The product was retained in the air at 1300° C. for 4 hours to fire, and further retained for 4 hours at a temperature of 1250° C. to anneal, thereby obtaining the dielectric ceramic. During the firing, the rate of temperature rise is 200° C./h, the rate that the temperature falls from the firing temperature to the annealing temperature is 20° C./h, and the rate that the temperature falls from the annealing temperature to room temperature is 200° C./h.

The dielectric ceramic was cooled to room temperature, and subsequently the resonant frequency was measured in the same manner as Example 1. Then, the dielectric ceramic was retained at a temperature of 700° C. to 1250° C. for 2 hours for heat treatment, cooled to room temperature, and then the resonant frequency was measured again. The rates of temperature rise and fall are 200° C./h during the heat treatment.

The produced dielectric ceramic had compositions similar to those of the sample No. 13 in Example 1.

Table 4 indicates a change rate of the resonant frequencies of the samples before and after the heat treatment. In Table 4, each number with an asterisk denotes a comparative example.

TABLE 4

| Sample No. | Heat treatment temp. (° C.) | Change rate of resonant frequency (%) |
|---|---|---|
| *23 | 700 | 0 |
| 24 | 800 | +0.10 |
| 25 | 850 | +0.12 |
| 26 | 900 | +0.06 |
| 27 | 950 | -0.13 |
| 28 | 1050 | -0.20 |
| 29 | 1100 | -0.20 |
| 30 | 1150 | -0.05 |
| 31 | 1200 | -0.03 |
| *32 | 1250 | 0 |

As shown in Table 4, the resonant frequencies of the dielectric ceramics of the present invention changed in a range from −0.20% to +0.12% due to the heat treatment. The resonant frequency can be adjusted in this manner since the crystalline structure of the dielectric ceramic according to the present invention is changed by the heat treatment. This method can be more precise and cost-effective in comparison with a method of adjusting frequency by polishing. The resonant frequencies did not change for the samples of comparative examples.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, all changes that come within the meaning and range of equivalency of the claims are intended to be embraced therein.

What is claimed is:

1. A dielectric ceramic comprising a sintered body of a complex oxide comprising at least one element selected from the group consisting of Zr, Ti and Mn, at least one element selected from the group consisting of Mg, Zn and Co, and at least one element selected from the group consisting of Nb and Ta, wherein the complex oxide is represented by a formula of $xZrO_2\text{-}yTiO_2\text{-}zA_{(1+w/3)}B_{(2-w/3)}O_2$ where 'A' in the formula denotes at least one element selected from the group (A) consisting of Mg, Zn and Co, 'B' denotes at least one element selected from the group (B) consisting of Nb and Ta; x, y, z and w denotes values in the respective ranges of $0.20 \leq x \leq 0.55$, $0.40 \leq y \leq 0.55$, $0.05 \leq z \leq 0.25$, and $0 \leq w \leq 0.30$, and x, y and z have a relationship represented as $x+y+z=1$, MnO is present in a range of 0.1 mol % to 1.0 mol % with respect to the complex oxide; and an average gram size of the dielectric ceramic is from 10 μm to 70 μm.

2. The dielectric ceramic according to claim 1, wherein the formula is represented by $xZrO_2\text{-}yTiO_2\text{-}zA_{(1+w/3)}Nb_{(2-w/3)}O_2$ where 'A' in the formula denotes at least one element selected from the group (A) consisting of Mg, and Zn; x, y, z and w denote values in the respective ranges of $0.32 \leq x \leq 0.43$, $0.50 \leq y \leq 0.54$, $0.07 \leq z \leq 0.14$, and $0 \leq w \leq 0.15$, and x, y and z have a relationship represented as $x+y+z=1$.

3. The dielectric ceramic according to claim 1, wherein the average grain size of the dielectric ceramic is from 10 μm to 50 μm.

4. The dielectric ceramic according to claim 1, wherein an unloaded Qu value of the dielectric ceramic is at least 18000.

5. The dielectric ceramic according to claim 1, wherein a dielectric constant (δr) of the dielectric ceramic is in a range of 36 to 49 when a resonant frequency is 2 GHz in a temperature range of −25° C. to 85° C.

6. The dielectric ceramic according to claim 1, wherein a temperature coefficient (τf) of the resonant frequency of the dielectric ceramic is at most 40 ppm/° C. as an absolute value.

7. The dielectric ceramic according to claim 1, wherein the dielectric ceramic is polished to have a thickness of 1 mm and a transverse rupture strength of at least 150 MPa in a four-point bend test method.

8. The dielectric ceramic according to claim 1, wherein a frequency region of the dielectric ceramic is from 0.4 GHz to 2.4 GHz.

9. A dielectric device comprising a metal housing and a dielectric ceramic that is made of a sintered body of a complex oxide and placed in a cavity of the metal housing, the sintered body of the complex oxide comprising at least one element selected from the group consisting of $Zr_1$ Ti and Mn, at least one element selected from the group consisting of Mg, Zn and Co, and at least one element selected from the group consisting of Nb and Ta, wherein the complex oxide is at least one element represented by a formula $xZrO_2\text{-}yTiO_2\text{-}zA_{(1+w/3)}B_{(2-w/3)}O_2$ where 'A' in the formula denotes at least one element selected from the group (A) consisting of Mg, Zn and Co, 'B' denotes at least one element selected from the group (B) consisting of Nb and Ta; x, y, z and w denote values in the respective ranges of $0.20 \leq x \leq 0.55$, $0.40 \leq y \leq 0.5$, $0.05 \leq z \leq 0.25$, and $0 \leq w \leq 0.30$, and x; y and z have a relationship represented as x+y+z =1, MnO is present in a range of 0.1 mol % to 1.0 mol % to the complex oxide; and an average grain size of the dielectric ceramic in from 10 µm to 70 µm.

10. The dielectric device according to claim 9, wherein the dielectric ceramic is a $TE_{01\delta}$ mode dielectric resonator.

11. The dielectric device according to claim 9, wherein the dielectric ceramic is a TM mode dielectric resonator.

12. The dielectric device according to claim 9, wherein the metal housing comprises at least one metal selected from the group consisting of copper, copper-plated steel, silver-plated copper, and silver-plated brass.

13. The dielectric device according to claim 9, wherein the dielectric ceramic is columnar.

14. The dielectric device according to claim 9, wherein the metal housing is shaped like a closed-type cylinder.

* * * * *

UNITED STATES PATENT AND TRADEMARK OFFICE
CERTIFICATE OF CORRECTION

PATENT NO. : 6,762,142 B2
DATED : July 13, 2004
INVENTOR(S) : Okuyama et al.

It is certified that error appears in the above-identified patent and that said Letters Patent is hereby corrected as shown below:

Column 10,
Lines 14 and 63, "-$zA_{(1+w/3}B_{(2-w/3}O_2$" should read -- -$zA_{(1+w)/3}B_{(2-w)/3}O_2$ --.
Line 27, "-$zA_{(1+w/3}Nb_{(2-w/3}O_2$" should read -- -$zA_{(1+w)/3}Nb_{(2-w)/3}O_2$ --.
Line 40, "($\delta r$)" should read -- ($\epsilon r$) --.
Line 45, "ppm/° C" should read -- ppm/°C --.
Line 58, "$Zr_1$ Ti" should read -- Zr, Ti --.

Column 11,
Line 2, "0.5" should read -- 0.55 --, and "x; y" should read -- x, y --.

Signed and Sealed this

Eleventh Day of October, 2005

JON W. DUDAS
*Director of the United States Patent and Trademark Office*